Nov. 19, 1957     G. W. HAMMAR     2,813,983

SIZE DISCRIMINATING RADIATION DETECTOR

Filed Aug. 24, 1955

Gustaf W. Hammar (Deceased)
Louise B. Hammar (Executrix)
INVENTORS

BY
ATTORNEYS

United States Patent Office 2,813,983
Patented Nov. 19, 1957

2,813,983

SIZE DISCRIMINATING RADIATION DETECTOR

Gustaf W. Hammar, deceased, late of Rochester, N. Y., by Louise B. Hammar, executrix, Rochester, N. Y., assignor, by mesne assignments, to the United States of America as represented by the Secretary of the Navy Application August 24, 1955, Serial No. 530,428

1 Claim. (Cl. 250—220)

This invention relates to size discriminating radiation detectors. Specifically, it relates to a photoelectric cell arrangement which will respond to images of small size as distinguished from images of large size.

The object of the invention is to provide a simple arrangement for doing this which will be reliable in its discrimination under all normal conditions. The simplicity of the present invention is one of its most useful characteristics, the value of which far outweighs the possibility of some unusually shaped image occurring which might confuse the ability of the system to discriminate as to size.

According to the invention the image to be detected is focused into a plane in any of the usual manners such as by a lens or concave mirror. An arrangement of photoconductive cells is located in the plane to receive and respond to the image. The photoresponsive system is made up of an array of cells all connected in parallel to a common output channel. However, half of the cells have their input sides connected to a source of positive electrical potential and the other half are similarly connected to a source of negative electrical potential. The cells are then arranged checkerwise with the positive potential cells located in areas corresponding to one color of a checkerboard and the negative potential cells in the other areas which correspond to the other color of the checkerboard. "Checkerwise" refers to such an arrangement whether the cells are square or non-square. A very small image will strike only one of such cells and produce a definite response either positive or negative. A larger image which in general will be brighter near the center and fall off in intensity toward the sides will almost invariably cover two cells or a plurality of cells with more or less equal positive or negative responses so that the outputs of the cells tend to cancel out. Such an arrangement works in practice to respond much stronger to a small image than to a larger one particularly if the image is moving across the image plane from cell to cell.

The object of the invention and the operation thereof will be more fully understood from the following description when read in connection with the accompanying drawing in which:

Fig. 1 schematically illustrates a radiation detecting system;

Fig. 2 similarly illustrates such a system incorporating the present invention;

Figure 1:
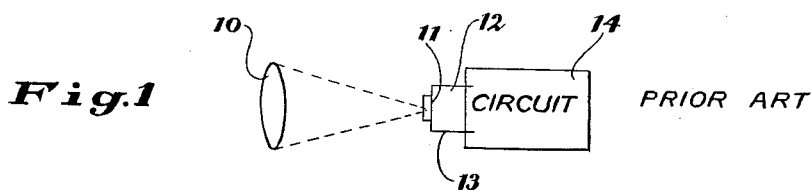

In Fig. 1 a lens 10 represents means for focusing an image of radiation such as light or infrared radiation onto a photocell 11, which in this case is a photoconductive cell responsive to the particular radiation being examined. The input and output circuits of the photocell 11 are represented by wires 12 and 13 connected to the operating circuit 14.

Figure 2:
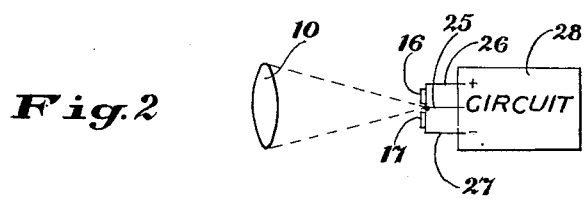
Figure 3:
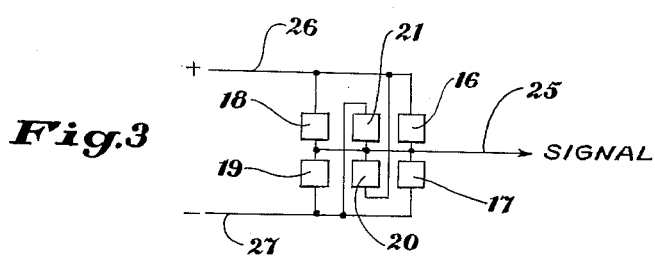
Fig. 3 is a front view of the photocells employed in Fig. 2.

The present invention is concerned only with the photoresponsive system. As shown in Figs. 2 and 3, the single cell 11 of Fig. 1 is replaced by a plurality of cells 16 through 21, all connected in parallel to a common output channel 25. Cells 16, 18 and 20 have their inputs also all connected in parallel through a wire 26 to a source of positive electrical potential in the circuit 28. Similarly, the cells 17, 19 and 21 are connected by a wire 27 in parallel to a source of negative potential in the circuit 28. If an image focused by the lamp 10 strikes only one of the cells 16 through 21, a definite signal passes through the output channel 25. If the image focused by the lens 10 is somewhat larger and simultaneously covers two adjacent cells, there will be equal and opposite output signals which will cancel each other. Theoretically an L-shaped image might strike three cells without striking the fourth, but in practice this is rarely encountered since most images are more or less round or rectangular in shape. It will be noted that the cells are arranged checkerwise with the cells 16, 18 and 20 in the areas corresponding to one color of the checkerboard and the cells 17, 19 and 21 in the areas corresponding to the other color of the checkerboard.

Figure 4:
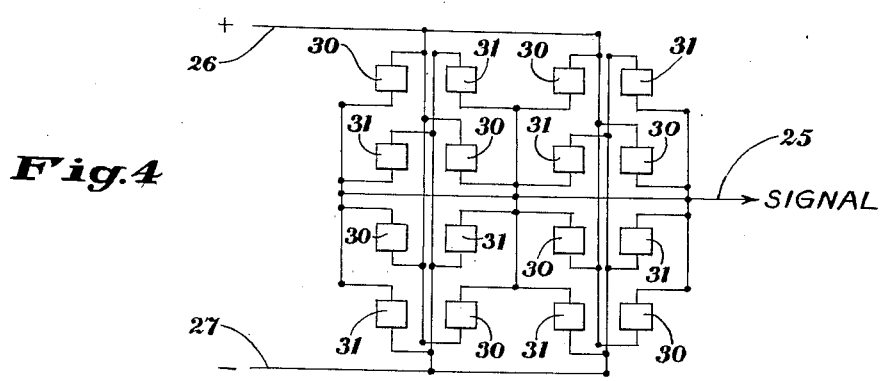
Fig. 4 illustrates a somewhat more elaborate arrangement of photocells for the same purpose.
Figure 5:
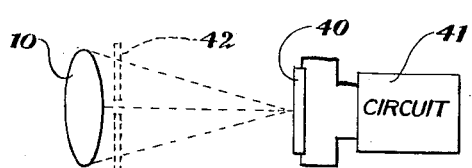
Fig. 5 schematically illustrates a radiation detector responsive to a large rather than a small image.

As shown in Fig. 4, this system can be extended to a larger array of cells still arranged checkerwise, cells 30 all being connected to a source of positive potential and cells 31 all being connected to a source of negative potential. The arrangements shown in Figs. 2, 3 and 4 all serve to discriminate between large and small images, in favor of the small image. If one is interested only in responding to images which are large, particularly in comparison with small, intense images, the arrangement shown in Fig. 5 may be used. In this case the lens 10 focuses the image on a single photoconductive cell 40 of large area. This cell is connected to a circuit 41 as in the previous cases. However, when a small image falls in the center or to one side of the cell 40, part of the cell near one or both of the electrodes thereof is not illuminated and continues to have a high resistance. In fact, the signal produced by any image is in general proportional to the product of the intensity and the area of the image. Hence, a large area image of the same total intensity will give a greater response. The broken lines 42 illustrate a diaphragm which tends to confine a small image even in the absence of the lens 10 to only a small area of the cell 40.

However, the present invention is primarily concerned with the arrangement for favoring small images and hence Figs. 2, 3 and 4 illustrate the preferred embodiment of the invention.

I claim:

A size discriminating radiation detector comprising means for focusing, approximately in a plane, an image to be detected, an array of photoconductive cells of approximately equal sensitivity in said plane to receive the image, conductors connecting all of said cells in parallel to a common output channel, means connecting the input sides of half of said cells in parallel to a source of positive electrical potential and means connecting the input sides of the other cells in parallel to a source of negative electrical potential, the cells being arranged checkerwise in the array with the positive and negative potential cells respectively located in the areas corresponding to the two colors of a checkerboard.

References Cited in the file of this patent

UNITED STATES PATENTS

| | | |
|---|---|---|
| 1,197,461 | Dixon | Sept. 5, 1916 |
| 2,412,822 | Malter | Dec. 17, 1946 |